Aug. 27, 1940.　　　　W. BRUNNHOELZL　　　　2,212,508
CONVEYER SYSTEM AND AUTOMATIC STOPPING AND STARTING MECHANISM THEREFOR
Filed July 18, 1938　　　2 Sheets-Sheet 1
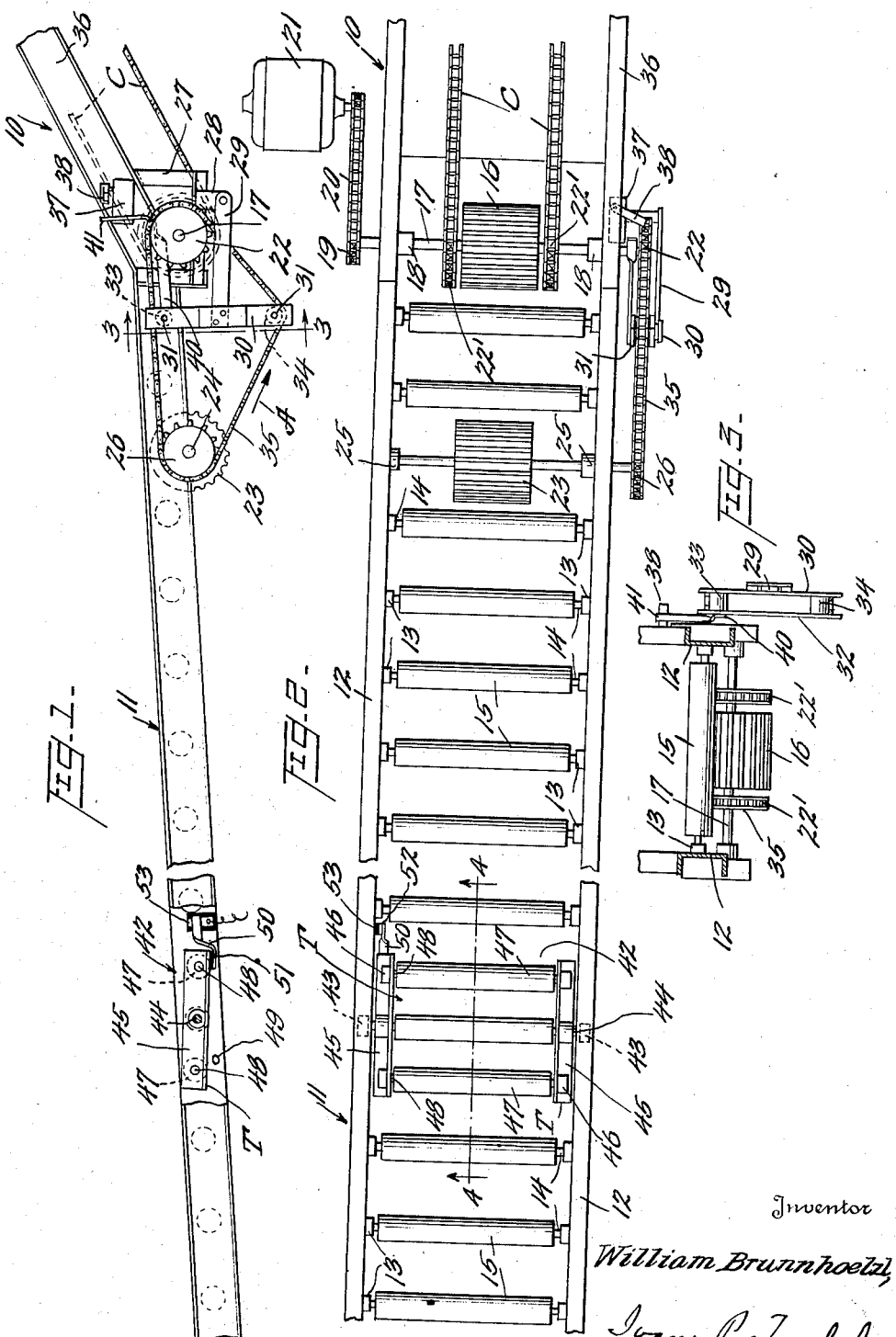

Aug. 27, 1940.   W. BRUNNHOELZL   2,212,508
CONVEYER SYSTEM AND AUTOMATIC STOPPING AND STARTING MECHANISM THEREFOR
Filed July 18, 1938   2 Sheets-Sheet 2
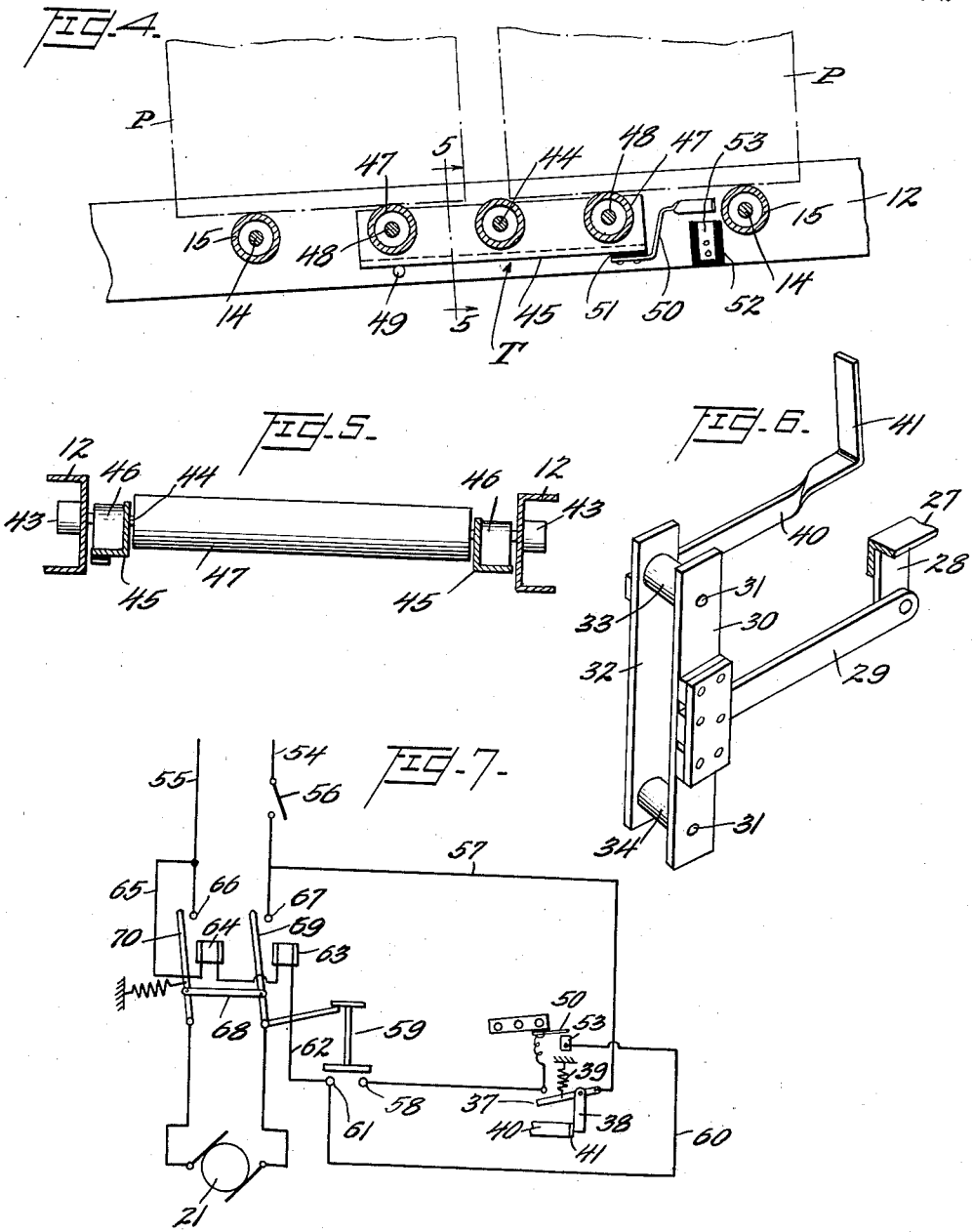

Patented Aug. 27, 1940

2,212,508

UNITED STATES PATENT OFFICE 2,212,508

CONVEYER SYSTEM AND AUTOMATIC STOPPING AND STARTING MECHANISM THEREFOR

William Brunnhoelzl, Brooklyn, N. Y., assignor to J. Julian Tashof, New York, N. Y., as trustee Application July 18, 1938, Serial No. 219,918

19 Claims. (Cl. 198—37)

The present invention relates to conveyers of the electric motor driven type used for conveying package goods and has special reference to an automatic stopping and starting mechanism for the motor drive of such conveyers, the device being preferably termed an automatic device for stopping and restarting conveyers.

Conveyers are frequently used for carrying empty boxes, crates and the like containers past a filling station at which place the boxes or crates are filled with the goods to be packed therein. At times, due to various causes, delay will occur in filling such a container with the result that it will be prevented from passing along the conveyer in the usual manner. This is very apt to cause collection of a line of such containers with injurious results such as piling up of containers and causing containers to leave the conveyer over its sides, breakage of the containers, injury to the conveying mechanism and other undesirable occurrences. Conveyers are also used for loading packages into a car, truck or other vehicle and interruptions to the loading operation may also result in collecting a line of containers with the above noted unwanted results.

In the delivery of boxes in breweries, it has been customary to provide a receiving line for receiving the boxes from the store-room. It has been necessary to provide the aforementioned receiving line with means to stop the delivery of boxes whenever the line became too full. The mechanisms hitherto employed, however, have not been entirely satisfactory. In most instances, they too frequently interrupt the delivery of the boxes.

In accordance with the present invention, however, a stopping mechanism has been provided which is particularly effective when used in conjunction with conveyers in breweries and similar establishments.

It is one principal object of the present invention to provide a novel device for effecting the stopping of a conveyer upon the occurrence of such abnormal conditions as result in retarding the regular movement of packages along the conveyer, the device being arranged to automatically reset itself upon the conveyer being restarted.

A second important object of the invention is to provide a novel means for starting a conveyer which has been stopped for clearing of such abnormal package conditions resulting from retardation of package movement, the device working automatically as soon as the abnormal conditions have been cured.

A third important object of the invention is to provide a conveyer system for packages having a portion from which packages pass, a portion receiving packages from the first portion, and means for preventing the delivery of packages from the first portion to the second portion when a package passing a predetermined point on the second portion has been retarded from normal movement, and means for causing the resumption of the delivery of packages upon restoration of normal movement over the second portion.

With the above and other objects in view, as will be presently apparent, the invention consists in general of certain novel details of construction and combinations of parts hereinafter fully described, illustrated in the accompanying drawings and particularly pointed out in the appended claims.

In the accompanying drawings like characters of reference indicate like parts in the several views, and:

Figure 1 is a side elevation of a portion of a conveyer system equipped with the present invention, the conveyer side being partly broken away to better disclose the invention.

Figure 2 is a plan view of the portion of the conveyer system shown in Figure 1.

Figure 3 is a detail section on the line 3—3 of Figure 1.

Figure 4 is an enlarged detail section on the line 4—4 of Figure 2.

Figure 5 is a section on the line 5—5 of Figure 4.

Figure 6 is a perspective view of part of a certain switch opening means used in this invention.

Figure 7 is a wiring diagram showing a form of motor circuit adapted for use with this invention.

In the embodiment of the invention here shown, the controlling mechanisms have been shown as applied to conveyer system having what may be termed a delivery portion 10 and a receiving portion 11. While these two conveyer portions have been shown as angularly disposed, the delivery portion power driven and the receiving portion of the gravity type, obviously, they may be both located in one plane or tilted at any angle. It is also clear that they may both be of the power driven type or both of the gravity type. The controlling mechanisms may be located anywhere along a conveyer system instead of as shown at the junction of the delivery and receiving portion. The receiving portion 10 is provided with side frame members 12 carrying pairs of alined bearings 13, wherein are mounted the journals 14 of a series of idler rolls 15. Between two of these idler rolls at the junction of the portions 10 and 11 is a serrated delivery drum or roller 16 which is fixed on a shaft 17. The shaft 17 is journalled in bearings 18 supported by the frame sides 12 and the ends of this shaft project laterally from the conveyer. On one end this shaft 17 is provided with a sprocket or pulley 19 connected by a chain or belt 20 with a driving motor 21. On the other end of the shaft 17 is fixed a sprocket wheel 22. Also mounted on the shaft 17 and driven thereby are a pair of driving wheels 22' which in turn drive the usual conveyer chains C. Spaced forwardly from the delivery roller or drum 16 is second serrated roller or drum 23 fixed upon a shaft 24 which is journalled in bearings 25 carried by the conveyer sides 12. One end of the shaft 24 projects laterally from the conveyer and a sprocket wheel 26 is fixed on this end in edgewise alinement with the sprocket wheel 22. A frame 27 depends from the conveyer frame adjacent the sprocket 22 and carries a bracket 28 to which is pivoted the rearward end of an arm 29 which projects forwardly to terminate opposite the space between the sprockets 22 and 26. On the forward end of the arm 29 is fixed the middle portion of an upright cross piece or T-head 30. Stub shafts 31 extend inwardly of the conveyer from the upper and lower end portions of the T-head 30 and carry on their inner ends a tie member 32 parallel to the T-head. Upper and lower idler rolls 33 and 34 are mounted for free revolution on the shafts 31 between the members 30 and 32. A sprocket chain 35 is trained around the sprocket wheels 22 and 26 and passes over the upper idler 33 and under the lower idler 34. These parts are so arranged that the upper run of the chain lies normally in a straight line, as shown in Figure 1. On the frame member 36 of conveyer 10 is mounted a normally closed electric switch of any preferred type, the casing of the switch being indicated at 37, its operating arm or lever at 38 and the spring for holding it normally closed at 39. Fixed to the member 32 is a trip arm 40 having an upstanding trip nose 41 which, upon upward swinging movement of the arm 29 on its pivot, travels in a path wherein lies the arm 38. This constitutes the motor cut-out means for stopping the feed drum 16. It may be noted that the member 32, operating arm 40 and other constituent parts pivoted with arm 29 are so arranged and balanced that the trip arm 40 will return to normal position even when the motor is stationary, providing there is no excess load on the drum 23.

Forward of the drum 23 several of the rollers 15 are omitted to provide a wide space 42. The conveyer sides centrally of this space are provided with alined bearings 43 wherein is mounted a shaft 44. On this shaft 44 between the conveyer sides 12 is a pair of tilting frame sides 45 carrying opposed bearings 46, said tilting frame sides constituting a part of a tilting switch indicated in general at T. Idler rolls 47 extend between the sides 45 and are provided with journals 48 mounted in the bearings 46. Normally this tilting section of the conveyor lies in such position that the top elements of the cylinders forming the rolls 47 tend to lie in a horizontal plane. Stops 49 may be used to limit downward movement of the forward end of this tilting frame. On the rear end of one of the members 45 is mounted a contact member 50, insulation 51 being provided between the members 45 and 50. On a frame side 12 is mounted a block of insulation 52 whereon is fixed a contact member 53 which lies in the path of the contact member 50. It will, therefore, be seen that when no packages are present and the tilting section is in a horizontal position, the switch 50—53 is closed, but that when a package or packages are present the bottom of the package on the rolls 47 will keep the section in alinement with rolls 15 and the switch open.

In Figure 7 there is shown one form of a simple wiring diagram connecting the motor and its controlled switches. At 54 and 55 is shown a pair of mains supplying current through an ordinary manually operated switch 56.

One side of the line 54 which is the usual power line, is connected by wire 57 to one terminal of switch 37. The other terminal of switch 37 is connected both to contact 50 and to one terminal 58 of an armature operated switch 59. The contact 53 of the tilting switch hereinbefore described is connected through wire 60 to another contact 61 of the armature operated switch 59. In other words, the contacts 58 and 61 and contacts 50 and 53 are connected in parallel to one side of the line 54 through the switch 37.

The contact 61 is connected by a wire 62 to the energizing coil 63 of the relay. The energizing coil 63 is in turn connected to an energizing coil of another relay 64 and the other terminal of the coil 64 is connected by wire 65 to the other side of the power line 55. Both sides of the power line 54 and 55 are adapted to be connected to the terminals of the motor through the contacts 66 and 67 of the armature operated double pole switch indicated in general at 68. It may be noted that the switch blades 69 and 70 adapted to close a circuit to the motor 21 from the wire 54 and 55, respectively, are operated upon by the electro-magnets whose energizing coils are indicated at 63 and 64.

The operation of the device employing the circuit of Figure 7 is as follows:

Assuming the delivery conveyer is ready to be started and the switch 37 and the switch 50, 53 are both closed, as would occur when the line 11 is empty, a circuit is established through one side of the line 54, wire 57, switch 37, contacts 50—53, wire 60, wire 62, armature coils 63 and 64, wire 65 to the other side of the line 55. The energizing coils 63 and 64 will, therefore, operate their respective electro-magnets, attracting the armatures 69, 70 which function to close contacts 67 and 66, thus energizing the motor. The energization of coils 63 and 64 will also close switch 59, as this switch is also operated by the armature 69. This will close the circuit through contacts 58 and 61 so that even if contacts 50 and 53 are then opened by the passing of packages thereover, a parallel holding circuit is established and the motor will continue to operate until switch 37 is open. When the conveyer line 11, however, becomes jammed or the packages stop, for any reason, to such an extent that the rotation of the drum 23 is retarded, the switch 37 will be opened.

The switch 37 operates in the following manner:

When packages collect on the conveyer portion 11 to such an extent that they prevent or retard the rotation of the drum or roller 23, the sprocket chain 35, which moves in the direction of the arrow A in Figure 1, will continue to be moved by the motor in such direction. This will cause slackening of the upper run of the chain and tightening of the lower run thereof. Normally, this lower run is deflected downwardly by the weight of the arm 29 and the parts carried thereby. When, however, this lower run of the chain is tightened, it will tend to straighten and will cause the arm 29 to swing upwardly on its pivot. This will cause the nose 41 to engage the switch operating lever 38 and move it to open position.

The opening of this switch will break the circuit to the magnetic coils 63 and 64 which will release their corresponding armatures and the circuit to the motor will be broken, thus stopping the motor. It is obvious, since the holding circuit through contacts 64 and 67 will also be broken by the movement of the armatures, that in order to start the motor again, it will be necessary to not only close switch 37, but also contacts 50—53. It will be necessary not only that the line be clear at the tilting switch T, but also at the drum 23.

If the delivery conveyer 10 is of the gravity type the switch 37 may be used to operate a detent to stop the flow of packages down the gravity conveyer, or a detent may be mechanically operated from the arm 29. The drum 16 will also function to stop the flow of packages if the conveyer 10 is of the gravity type and the drum is positioned in the path of the descending package.

Although the apparatus according to the present invention, is especially suitable for the transporting of packages, such as beer cases and the like, it is also suitable for use in conjunction with any conveyer system for the transporting of various objects. For example, it may be used for the transporting of cakes of ice, fruit boxes, pieces of timber, sacks of flour or any other suitable package ordinarily transported on a conveyer, and will serve to effectually prevent the over-crowding of a receiving line from a supply line.

Although during the normal operation of the receiving conveyer 10, a continuous line of spaced boxes is transported, it is obvious that the device may be used to transport a continuous line of boxes or one containing irregular breaks or interruptions therein.

What is claimed is:

1. In a conveyer system for packages, said system having a portion from which packages pass, and a portion receiving packages from the first portion, means for delivering packages from the first to the second portion, a swinging arm pivotally mounted to permit the operation of said delivery means in one position and prevent the operation of the delivery means in another position, rotatable means interposed in said second portion over which said packages pass, an operative connection between said rotatable means and said arm for swinging said arm to operation preventing position upon retarding of the rotation of said rotatable means.

2. In a conveyer system for packages, said system having a power driven delivery portion from which packages pass, and a portion receiving packages from the first portion, means for driving said first mentioned portion, a swinging arm pivotally mounted and operative upon said driving means to permit the operation thereof in one position and prevent operation thereof in another position, rotatable means interposed in said second portion over which said packages pass, and an operative connection between said rotatable means and said arm for swinging said arm to prevent operation of said driving means upon retarding of the rotation of said rotatable means.

3. In a conveyer system for packages, said system having a portion from which packages pass and a portion receiving packages from the first portion, electric motor driven means for delivering packages from the first to the second portion, and including a motor circuit having a normally closed switch, a swinging arm pivotally mounted to engage and open said switch, rotatable means interposed in said second portion over which said packages pass, and an operative connection between said rotatable means and said arm for swinging said arm and opening said switch upon retarding of the rotation of said rotatable means.

4. In a conveyer system for packages, said system having a portion from which packages pass and a portion receiving packages from the first portion, electric motor driven means for delivering packages from the said first portion to the second portion and including a motor operating circuit having a normally closed switch, means for moving said switch to open position upon abnormal collecting together of packages moving over the said second portion, a second switch positioned adjacent said second portion and adapted to be opened by a package when the package is positioned on said second portion adjacent said switch and normally closed, and means for closing a shunt holding circuit across said second switch when both said first and second switches are closed.

5. In a conveyer system for packages, said system having a portion from which packages pass, and a portion receiving packages from the first portion, electric motor driven means for delivering packages from the first portion to the second portion and including a motor operating circuit having a normally closed switch, means for opening said switch upon a package passing a predetermined point on the second portion being retarded from normal movement, a second switch positioned adjacent said second portion and adapted to be opened by a package when the package is positioned on said second portion adjacent said switch and normally closed, and means for closing a shunt holding circuit across said second switch when both said first and second switches are closed.

6. In a conveyer system for packages, said system having a portion from which packages pass and a portion receiving packages from the first portion, electric motor driven means for delivering packages from the first portion to the second portion and including a motor operating circuit having a normally closed switch, a swinging arm pivotally mounted to engage and open said first switch, rotatable means interposed in said second portion over which said packages pass, and an operative connection between said rotatable means and said arm for swinging said arm and opening said switch upon retarding of the rotation of said rotatable means, a second switch positioned adjacent said second portion and adapted to be opened by a package when the package is positioned on said second portion adjacent said switch and normally closed, and means for closing a shunt holding circuit across said second switch when both said first and second switches are closed.

7. In a conveyer system for packages, said system having a portion from which packages pass and a portion receiving packages from the first portion, electric motor driven means for delivering packages from the first to the second portion and including a motor operating circuit having a normally closed switch, a sprocket connected to said motor driven means and revolving therewith, rotatable means interposed in said second conveyer portion, a second sprocket connected to said rotatable means and revolving therewith, a chain trained loosely around said sprockets, an arm pivoted adjacent the first sprocket and extending toward the other sprocket, an idler pulley carried by said arm and resting on the lower run of the chain and a switch opening element supported from said arm to open the switch upon raising of the free end of said arm from normal position.

8. In a conveyer system for packages, said system having a portion from which packages pass and a portion receiving packages from the first portion, electric motor driven means for delivering packages from the first to the second portion, and including a motor operating circuit having a normally closed switch, said motor driven means including a revolving drum at the junction of said portions for delivering packages from said first to said second portion, a sprocket connected to said drum and revolving therewith, a second drum carried by the second conveyer portion and having a shaft, a second sprocket fixed on said shaft, a chain trained loosely around said sprockets, an arm pivoted adjacent the first sprocket and extending towards the other sprocket, an idler pulley carried by said arm and resting on the lower run of the chain, and a switch opening element supported from said arm to open the switch upon raising of the free end of said arm from normal position.

9. In a conveyer system for packages, said system having a portion from which packages pass and a portion receiving packages from the first portion, electric motor driven means for delivering packages from the said first to the said second portion, and including a motor operating circuit having a normally closed switch, said motor driven means including a revolving drum at the junction of said portions for delivering packages from said first to said second portion, a sprocket connected to said drum and revolving therewith, a second drum carried by the second conveyer portion and having a shaft, a second sprocket fixed on said shaft, a chain trained loosely around said sprockets, an arm pivoted adjacent the first sprocket and extending towards the other sprocket, an idler pulley carried by said arm and resting on the lower run of the chain, a switch opening element supported from said arm to open the switch upon raising of the free end of said arm from normal position, and means to reclose said switch upon restoration of the arm to normal position.

10. In a conveyer system for packages, said system having a portion from which packages pass and a portion receiving packages from the first portion, electric motor driven means for delivering packages from the said first to the said second portion, and including a motor operating circuit having a normally closed switch, a swinging arm pivotally mounted to engage and open said first switch, rotatable means interposed in said second portion over which said packages pass, an operative connection between said rotatable means and said arm for swinging said arm and opening said first switch upon retarding of the rotation of said rotatable means, a second switch positioned adjacent said second portion and adapted to be opened by a package when the package is positioned on said second portion adjacent said switch and normally closed, and means for closing a shunt holding circuit across said second switch when both said first and second switches are closed.

11. In a conveyer system for packages, said system having a portion from which packages pass and a portion receiving packages from the first portion, electric motor driven means for delivering packages from the said first to the said second portion, and including a motor operating circuit having a normally closed switch, said motor driven means including a revolving drum at the junction of said portions for delivering packages from said first to said second portion, a sprocket connected to said drum and revolving therewith, a second drum carried by the second conveyer portion and having a shaft, a second sprocket fixed on said shaft, a chain trained loosely around said sprockets, an arm pivoted adjacent the first sprocket and extending towards the other sprocket, an idler pulley carried by said arm and resting on the lower run of the chain, a switch opening element supported from said arm to open the switch upon raising of the free end of said arm from normal position, a second switch positioned adjacent said second portion and adapted to be opened by a package when the package is positioned on said second portion adjacent said switch and normally closed, and means for closing a shunt holding circuit across said second switch when both said first and second switches are closed.

12. In a package conveyer system, a motor for driving said system, a tilting frame over which articles travelling along the system pass, an electric contact element carried by said frame to move in a restricted path upon tilting of said frame, a second contact in the path of said first contact for engagement by the first contact upon tilting of the frame in one direction, circuit connections between said contacts and a current supply adapted to energize said motor, a drum positioned for rolling contact with packages traversing along said system, a normally closed switch in series with said contacts, and means actuated by retarding the movement of said drum for opening said switch.

13. In a package conveyer system, a motor for driving said system, a tilting frame over which articles travelling along the system pass, an electric contact element carried by said frame to move in a restricted path upon tilting of said frame, a second contact in the path of said first contact for engagement by the first contact upon tilting of the frame in one direction, circuit connections between said contacts and a current supply adapted to energize said motor, a drum positioned for rolling contact with packages traversing along said system, a normally closed switch in series with said contacts, and means actuated by retarding the movement of said drum for opening said switch, and means for closing a shunt circuit across said contacts when both said switch and said contacts are closed.

14. In a package conveyer system, a motor for driving said system, a tilting frame over which articles travelling along the system pass, an electric contact element carried by said frame to move in a restrictive path upon tilting of said frame, a second contact in the path of said first contact for engagement by the first contact upon tilting of the frame in one direction, circuit connections between said contacts and a current supply adapted to energize said motor, a drum positioned for rolling contact with packages traversing along said system, a normally closed switch in series with said contacts, means actuated by retarding the movement of said drum for opening said switch, means for closing a shunt circuit across said contacts when both said switch and said contacts are closed, and a relay for closing a circuit between said motor and a power source when said first circuit is closed.

15. In a conveyer system for packages, said system having a portion from which packages pass and a portion receiving packages from the first portion, electric motor driven means for delivering packages from the said first to the said second portion, and including a motor operating circuit having a normally closed switch, a swinging arm pivotally mounted to engage and open said first switch, rotatable means interposed in said second portion over which said packages pass, an operative connection between said rotatable means and said arm for swinging said arm and opening said first switch upon retarding of the rotation of said rotatable means, a second switch positioned adjacent said second portion and adapted to be opened by a package when the package is positioned on said second portion adjacent said switch and normally closed, and means for preventing the breaking of the motor operating circuit by said second switch during normal operation.

16. In a conveyer system for packages, said system having a portion from which packages pass and a portion receiving packages from the first portion, electric motor driven means for delivering packages from the said first to the said second portion and including a motor operating circuit having a normally closed switch, means actuated upon retardation of the movement of packages over said second portion to open said switch, a second switch positioned adjacent said second portion and adapted to be opened by a package when the package is positioned on said second portion adjacent said switch and normally closed, and means for preventing the breakage of the motor operating circuit by said second switch during normal operation.

17. In a conveyer system, a power driven feed conveyer, a second conveyer positioned to receive packages from said feed conveyer, means movable with the packages on the second conveyer and retarded upon package retardation, a driving connection between the movable means and the feed conveyer, and means operated by said driving connection to stop said feed conveyer upon retardation of movement of said movable means by the packages.

18. In a conveyer system, a power driven feed conveyer, a gravity conveyer positioned to receive packages from said feed conveyer, a power driven member adjacent said gravity conveyer, movable with the packages on the gravity conveyer and retarded upon package retardation, a driving connection between the power driven member and the feed conveyer and means operated by said driving connection to stop said feed conveyer upon retardation of movement of said driven member by the packages.

19. In a conveyer system, a power driven feed conveyer, a second conveyer positioned to receive packages from said feed conveyer, means movable with the packages on the second conveyer and retarded upon package retardation, means to stop said feed conveyer upon retardation of movement of said movable means by the packages, and means operated by the packages independently of said movable means to start said feed conveyer on resumption of normal movement of packages on the second conveyer.

WILLIAM BRUNNHOELZL.